(12) United States Patent
Huang

(10) Patent No.: US 8,861,192 B2
(45) Date of Patent: Oct. 14, 2014

(54) ELECTRONIC DEVICE DESIGNED FOR HOLDING HIGH-DEFINITION MULTIMEDIA INTERFACE CONNECTOR

(71) Applicant: Yi-Ming Huang, Shenzhen (CN)

(72) Inventor: Yi-Ming Huang, Shenzhen (CN)

( * ) Notice: Subject to any disclaimer, the term of this patent is extended or adjusted under 35 U.S.C. 154(b) by 97 days.

(21) Appl. No.: 13/673,725

(22) Filed: Nov. 9, 2012

(65) Prior Publication Data

US 2014/0133077 A1 May 15, 2014

(51) Int. Cl.
G06F 1/16 (2006.01)
H04M 1/02 (2006.01)
G06F 1/18 (2006.01)

(52) U.S. Cl.
CPC ............... G06F 1/18 (2013.01); H04M 1/0274 (2013.01); H04M 1/0202 (2013.01)
USPC .............. 361/679.32; 361/679.38; 361/679.4; 361/679.43

(58) Field of Classification Search
CPC .................................................... G06F 1/1656
USPC ...................................................... 361/679.4
See application file for complete search history.

(56) References Cited

U.S. PATENT DOCUMENTS

| | | | | |
|---|---|---|---|---|
| 5,889,649 A | * | 3/1999 | Nabetani et al. | 361/679.38 |
| 6,369,798 B1 | * | 4/2002 | Yatsu et al. | 345/167 |
| 7,042,715 B2 | * | 5/2006 | Lin et al. | 361/679.4 |
| 7,076,581 B2 | * | 7/2006 | Cheng | 710/74 |
| 7,654,459 B2 | * | 2/2010 | Orsley et al. | 235/427 |
| 7,675,745 B2 | * | 3/2010 | Rankins et al. | 361/679.41 |
| 7,679,901 B2 | * | 3/2010 | Lin | 361/679.43 |
| 2004/0075977 A1 | * | 4/2004 | Lee | 361/684 |
| 2004/0263471 A1 | * | 12/2004 | Hsieh | 345/156 |
| 2005/0270735 A1 | * | 12/2005 | Chen | 361/683 |
| 2006/0022943 A1 | * | 2/2006 | Johnson et al. | 345/157 |
| 2007/0247803 A1 | * | 10/2007 | Eickholdt | 361/685 |
| 2008/0180057 A1 | * | 7/2008 | Watanabe | 320/103 |
| 2012/0039051 A1 | * | 2/2012 | Chang | 361/752 |
| 2012/0069518 A1 | * | 3/2012 | Hsu et al. | 361/679.58 |
| 2012/0069535 A1 | * | 3/2012 | Cai et al. | 361/752 |
| 2012/0162885 A1 | * | 6/2012 | Iwamoto et al. | 361/679.4 |
| 2012/0243158 A1 | * | 9/2012 | Gentil | 361/679.03 |

* cited by examiner

Primary Examiner — Anthony Q Edwards
(74) Attorney, Agent, or Firm — Muncy, Geissler, Olds & Lowe, P.C.

(57) ABSTRACT

An electronic device designed for holding a High-Definition Multimedia Interface connector is disclosed. The electronic device has a receiving socket for receiving the connector that serves to convert audio/video signals of the electronic device into a format of HDMI, and output the converted signals to a terminal. Thereby, the connector not in use can be carried with the electronic device, and can be conveniently detached from the electronic device and connected to the terminal.

14 Claims, 8 Drawing Sheets

ELECTRONIC DEVICE DESIGNED FOR HOLDING HIGH-DEFINITION MULTIMEDIA INTERFACE CONNECTOR

BACKGROUND OF THE INVENTION

1. Technical Field

The present invention relates to electronic devices, and more particularly, to an electronic device that is designed for holding a High-Definition Multimedia Interface connector, so that the connector can be detachably attached to and stored with the electronic device.

2. Description of Related Art

High-Definition Multimedia Interface connectors are known to work with electronic devices such as mobile phones, tablet computers and notebook computers to convert and transmit audio/video signals of the electronic devices to an external terminal, such as a TV set or a HDTV set. Since such a connector is typically made independent of any electronic devices, it is frequent that people forget to carry it with their electronic devices and thus are unable to enjoy the multimedia contents they like. Even if the connector is carried as an independent object, a user may have problem to find it out among many computer peripherals, adding inconvenience to its use. Therefore, there is thus a need for designing an electronic device that facilitates portability of a High-Definition Multimedia Interface connector, so as to allow more convenient play of audio/video contents.

SUMMARY OF THE INVENTION

To satisfy the unmet needs, the present invention discloses herein an electronic device designed for holding a High-Definition Multimedia Interface connector that serves to convert audio/video signals of the electronic device into HDMI signals. The electronic device has a receiving socket so that the connector can be removably received in the receiving socket and conveniently carried with the electronic device.

According to the present invention, an electronic device designed for holding a High-Definition Multimedia Interface connector that serves to convert audio/video signals of the electronic device into signals of a format of HDMI and output the signals to a terminal has a receiving socket so that the connector is removably received in the receiving socket.

To achieve the foregoing objective, a retaining device composed of a wedge and a spring is installed in the receiving socket of the disclosed electronic device, and a positioning hole is formed on a lateral surface of the connector so that a propping end of the wedge is pushed by the spring toward and gets received in the positioning hole. Thereby, when the connector is received in the receiving socket, the retaining device optionally engages with the lateral of the connector.

To achieve the foregoing objective, an ejection device composed of a pushing member and a resilient member is installed in the receiving socket of the disclosed electronic device. The resilient member serves to make the pushing member keep pushing the connector, so that when the connector is received in the receiving socket, the ejection device resiliently pushes the connector.

To achieve the foregoing objective, a jacket is pivotally installed in the receiving socket of the disclosed electronic device for receiving the connector in the receiving socket.

To achieve the foregoing objective, the receiving socket of the disclosed electronic device is provided therein with a resilient retainer and the connector has one lateral provided with a positioning hole for fittingly receiving the resilient retainer and engaging with the connector.

To achieve the foregoing objective, the receiving socket of the disclosed electronic device is deposited on a back or lateral surface of the electronic device.

To achieve the foregoing objective, the electronic device of the present invention may be a smartphone, a tablet computer or a notebook computer.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

The following preferred embodiments when read with the accompanying drawings are made to clearly exhibit the above-mentioned and other technical contents, features and effects of the present invention. Through the exposition by means of the specific embodiments, people would further understand the technical means and effects the present invention adopts to achieve the above-indicated objectives. However, the accompanying drawings are intended for reference and illustration, but not to limit the present invention and are not made to scale.

Figure 1:
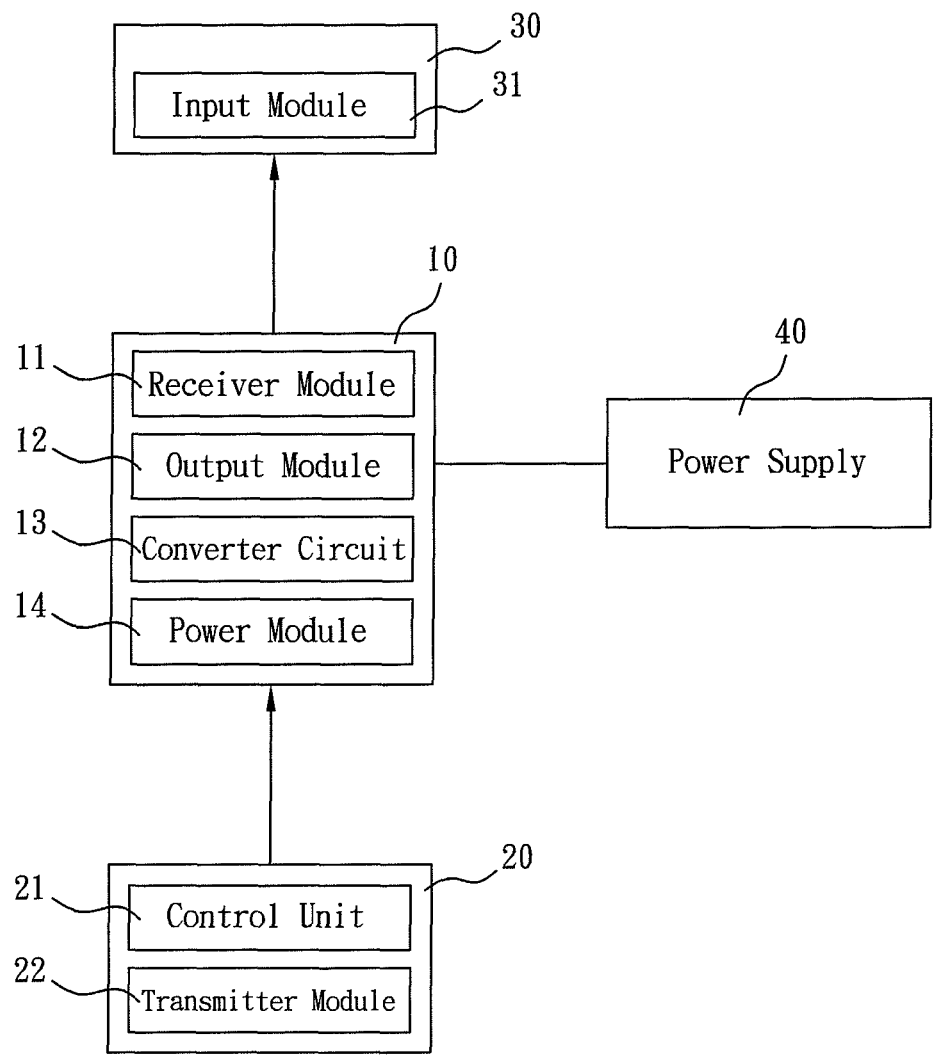
FIG. 1 is a block diagram schematically illustrating the use of the present invention.

Please refer to FIG. 1 for a block diagram schematically illustrating the use of the present invention. A connector 10 is configured to make audio/video signals of an electronic device 20 get displayed in a terminal 30.

The connector 10 comprises a receiver module 11, an output module 12, a converter circuit 13 and a power module 14. The connector 10 is electrically connected to a power supply 40 through a power module 14.

The electronic device 20 comprises a control unit 21 and a transmitter module 22. The control unit 21 serves to make the transmitter module 22 transmit the audio/video signals of the electronic device 20 to the receiver module 11 in a wireless manner. Then the converter circuit 13 converts the audio/video signal into HDMI signals. The electronic device 20 may be a smartphone, a tablet computer or a notebook computer.

The terminal 30 has an input module 31, which is like the output module 12 of the connector 10 as being an HDMI port for transmitting HDMI signals. The terminal 30 may be a TV set, an HDTV set or an electronic device capable of playing audio/video signals. When the output module 12 of the connector 10 is coupled to the input module 31 of the terminal 30, the electronic device 20 is allowed to have its high-definition multimedia audio/video signals wirelessly sent to and synchronously displayed in the terminal 30 through the connector 10, so as to realize extensive play.

Figure 2:
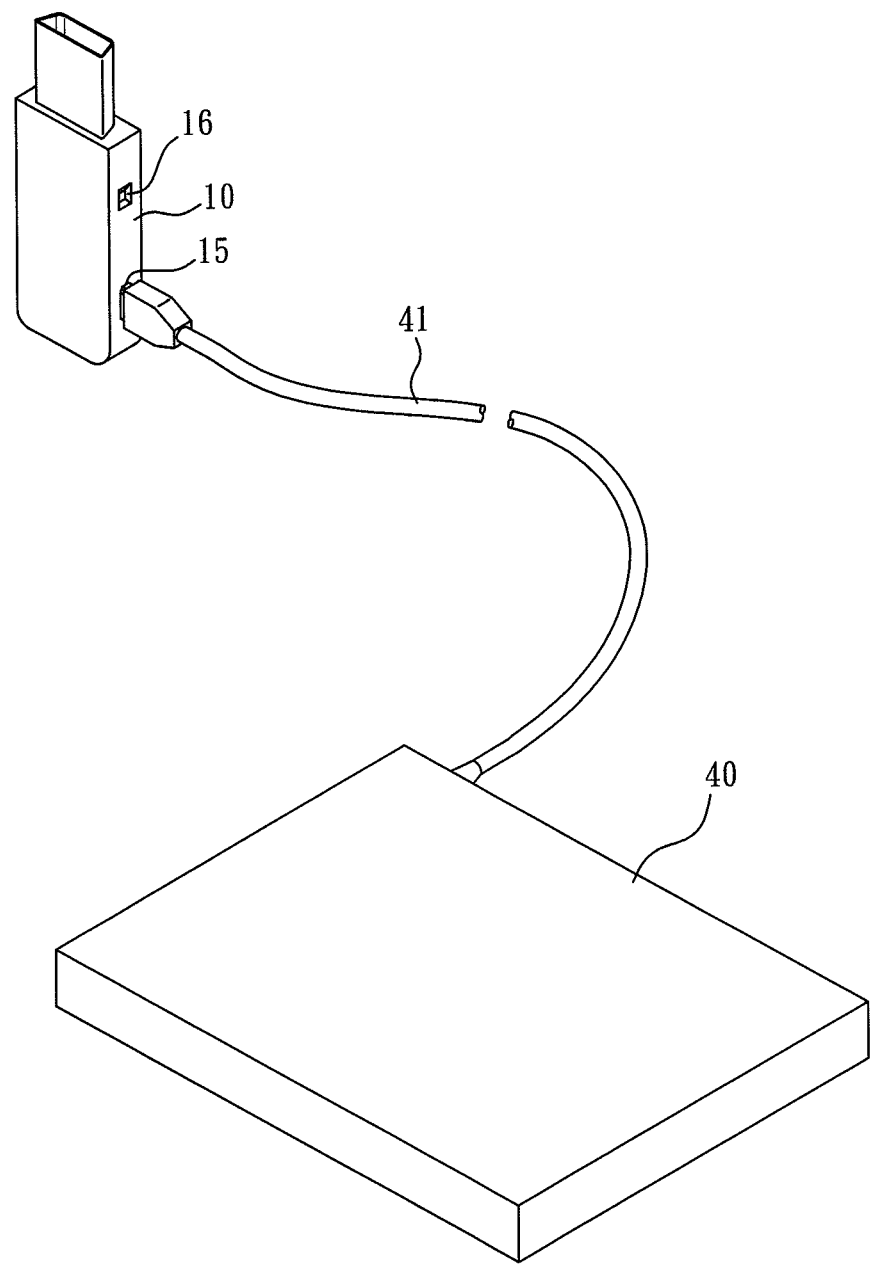
FIG. 2 is a schematic drawing according to the present invention illustrating a connector connected to a power supply.

Referring to FIG. 2, the connector 10, as shown, is connected to a power supply 40. The connector 10 comprises a power input 15 for receiving a power cord 41 of the power supply 40 and a positioning hole 16 formed beside the power input 15.

Figure 3:
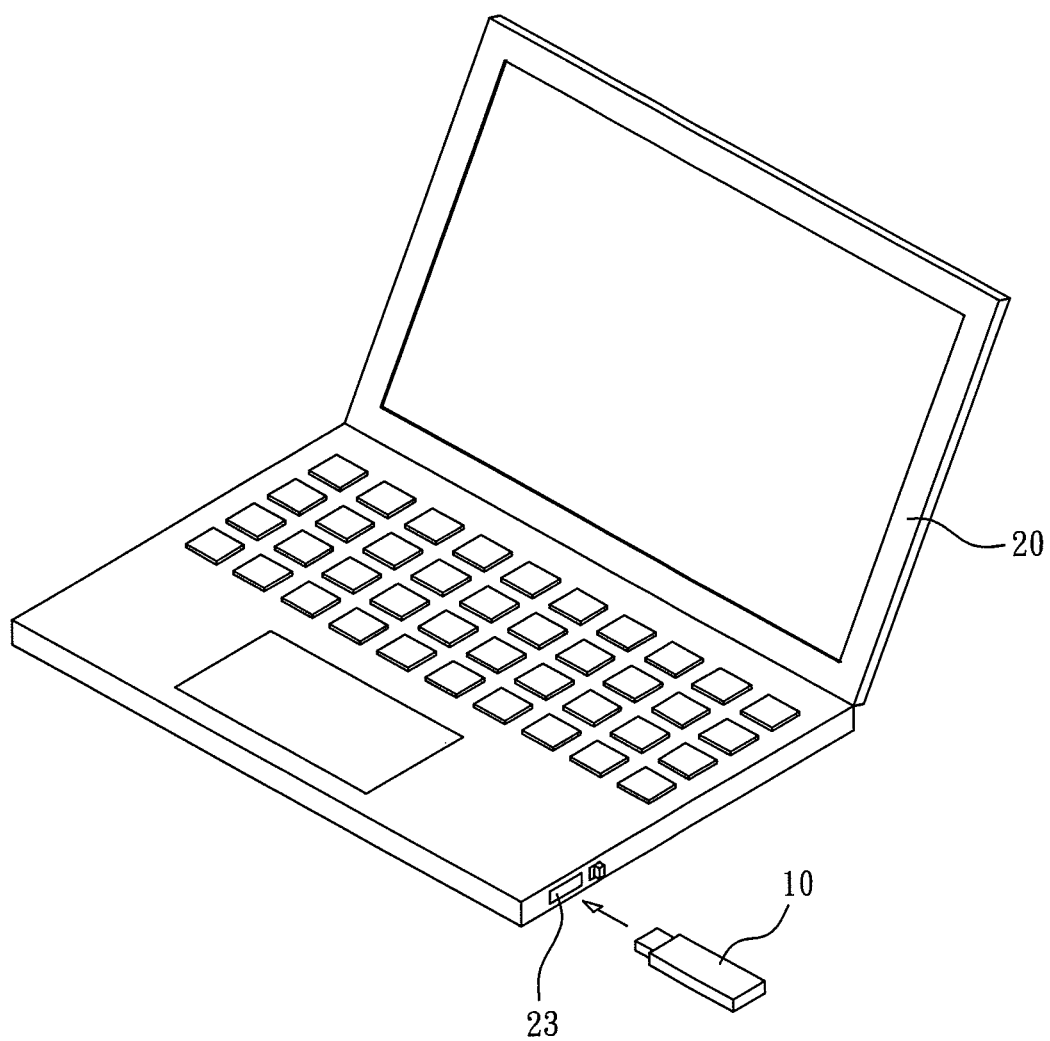
FIG. 3 is a schematic drawing according to the present invention illustrating an embodiment of an electronic device working with the connector.
Figure 4:
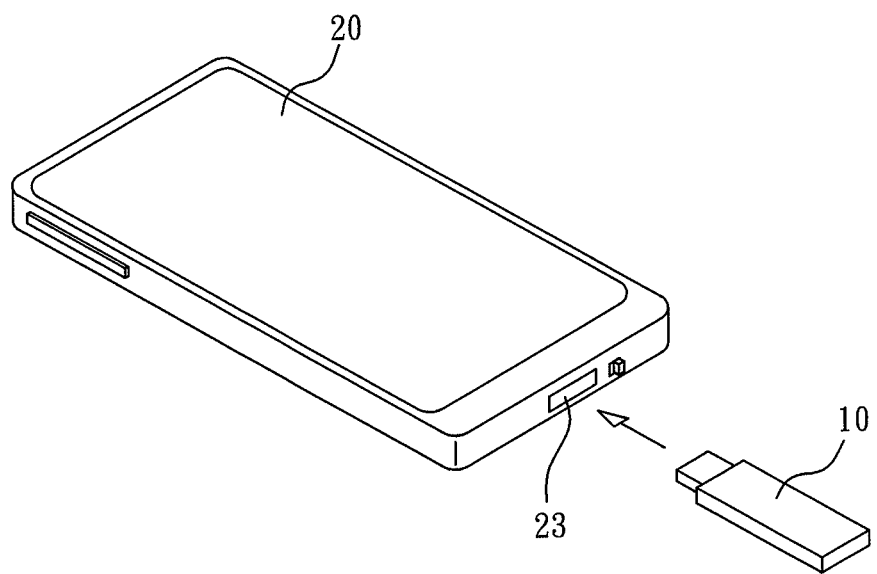
FIG. 4 is a schematic drawing according to the present invention illustrating another embodiment of the electronic device working with the connector.

Referring to FIG. 3 and FIG. 4, the connector 10 is to be inserted into a receiving socket 23 provided on one lateral surface of the electronic device 20 for storage. Thereby, the connector 10 not in use is stored in position within the electronic device 20 and thus is prevented from being lost or difficult to be identified from other similar computer peripheries, such as flash drives. The electronic device 20 may be a notebook computer as shown in FIG. 4, or a smartphone as shown in FIG. 5.

Figure 5:
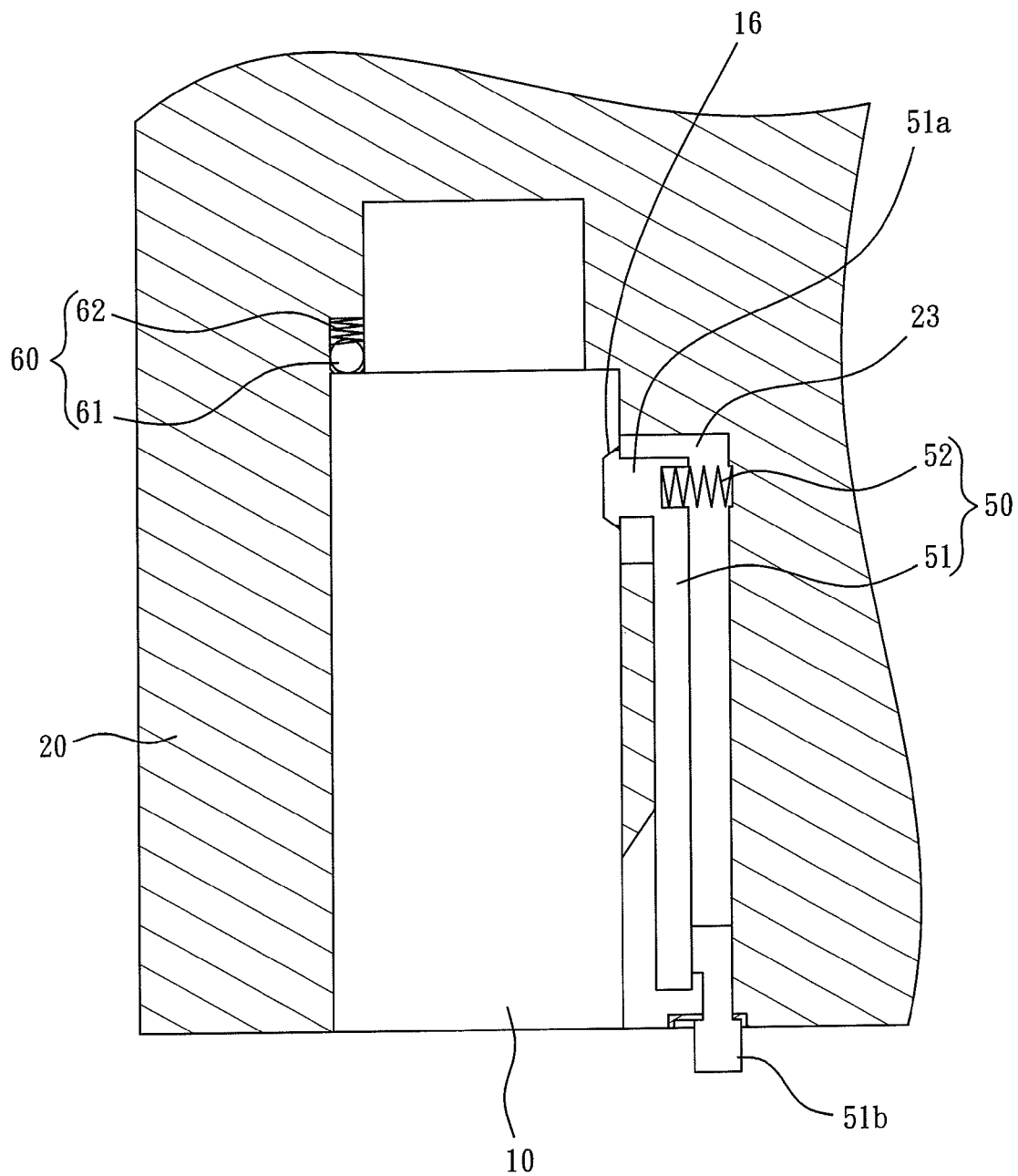
FIG. 5 and FIG. 6 show the connector combined with a receiving socket of the electronic device according to one embodiment of the present invention.

Referring to FIG. 5, the connector 10 is inserted in the receiving socket 23 of the electronic device 20 in position. The receiving socket 23 contains therein a retaining device 50 for optionally engaging with the positioning hole 16 of the connector 10, so as to retain the connector 10 from leaving the receiving socket 23. The retaining device 50 includes a wedge 51 and a spring 52. The wedge 51 has a propping end 51a pushed by the spring 52 toward the positioning hole 16. The wedge 51 has an operation end 51b exposed outside the electronic device 20, and, when operated, can make the wedge 51 engage with or disengage from the positioning hole 16. In addition, the receiving socket 23 contains therein an ejection device 60. When the connector 10 is received in the receiving socket 23, the ejection device 60 resiliently pushes the connector 10. The ejection device 60 comprises a pushing member 61 and a resilient member 62. The resilient member 62 serves to make the pushing member 61 keep pushing the connector 10 and may be a ball.

Figure 6:
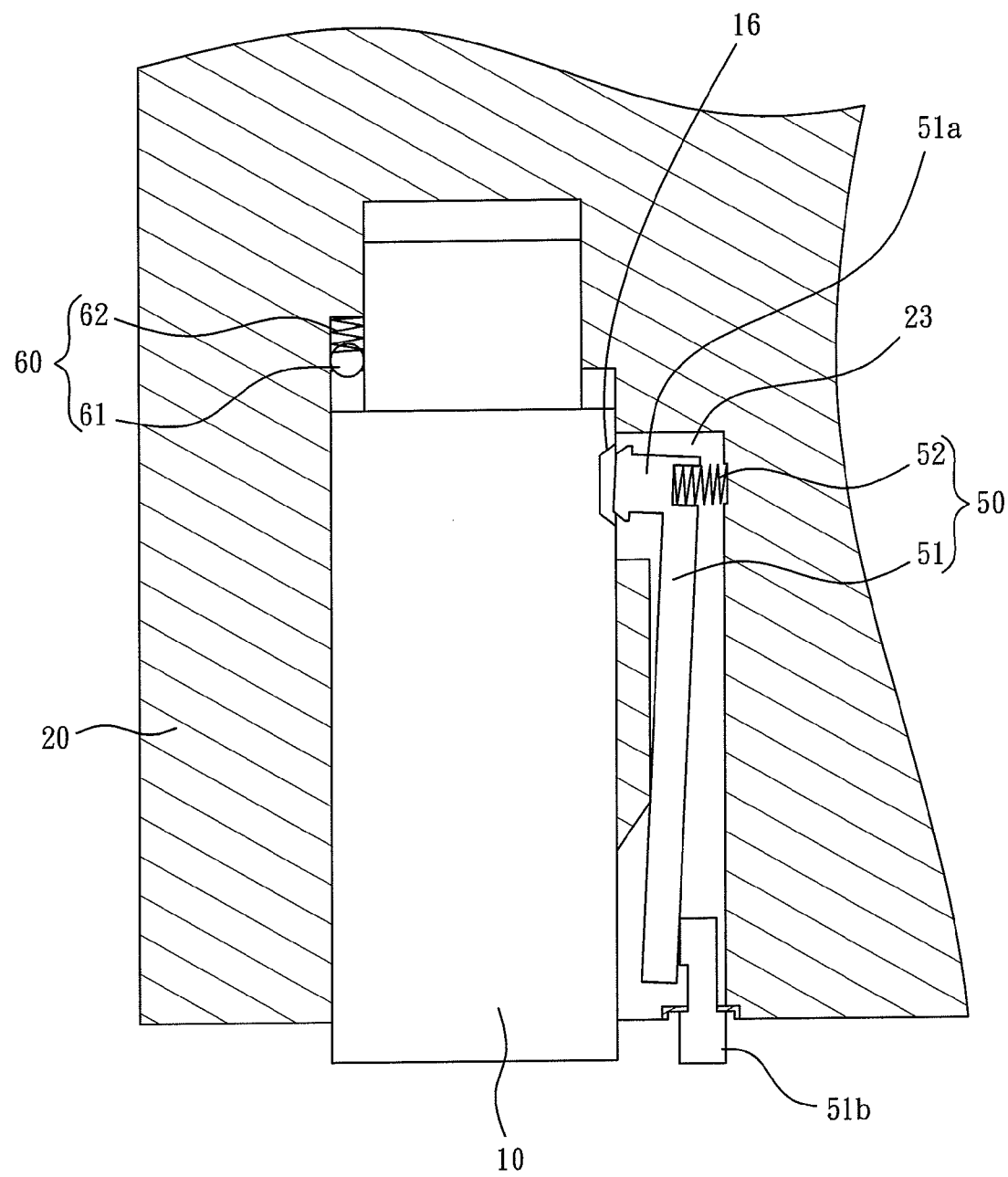

As shown in FIG. 6, the connector 10 is now ready to leave the receiving socket 23 of the electronic device 20 as the operation end 51b of the wedge 51 is such operated that the wedge 51 swing to disengage the propping end 51a from the positioning hole 16. At this time, the connector 10 is no more retained by the retaining device 50, and can be ejected from the receiving socket 23 by the pushing force of the ejection device 60, for the user to take and use.

Figure 7:
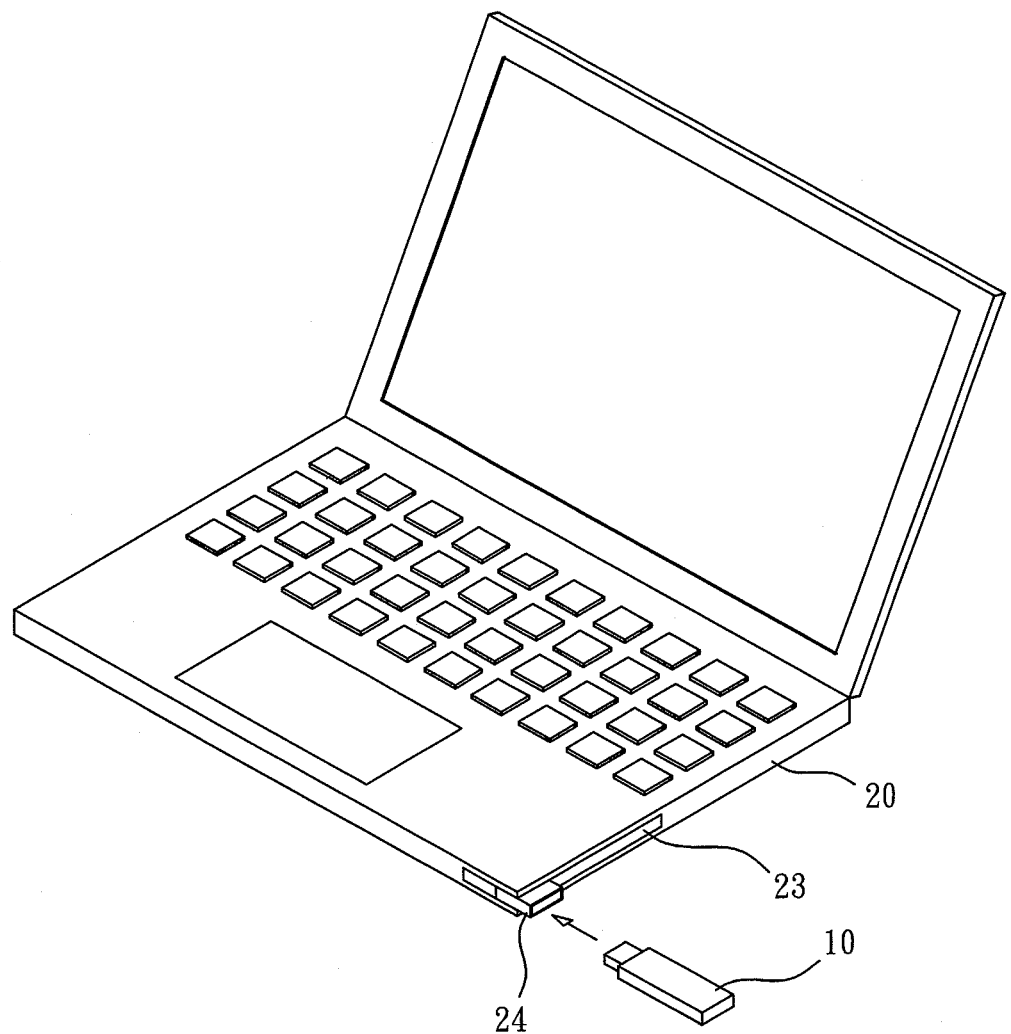
FIG. 7 and FIG. 8 provide more embodiments of the electronic device of the present invention.

FIG. 7 shows another embodiment of the electronic device 20. Dissimilar from the above embodiment, the receiving socket 23 of the electronic device 20 is provided with a jacket 24 that is pivotally received within the receiving socket 23 for receiving the connector 10 therein, so that the connector 10 housed by the jacket 24 can pivot into the receiving socket 23 and not exposed outside the electronic device 20.

Figure 8:
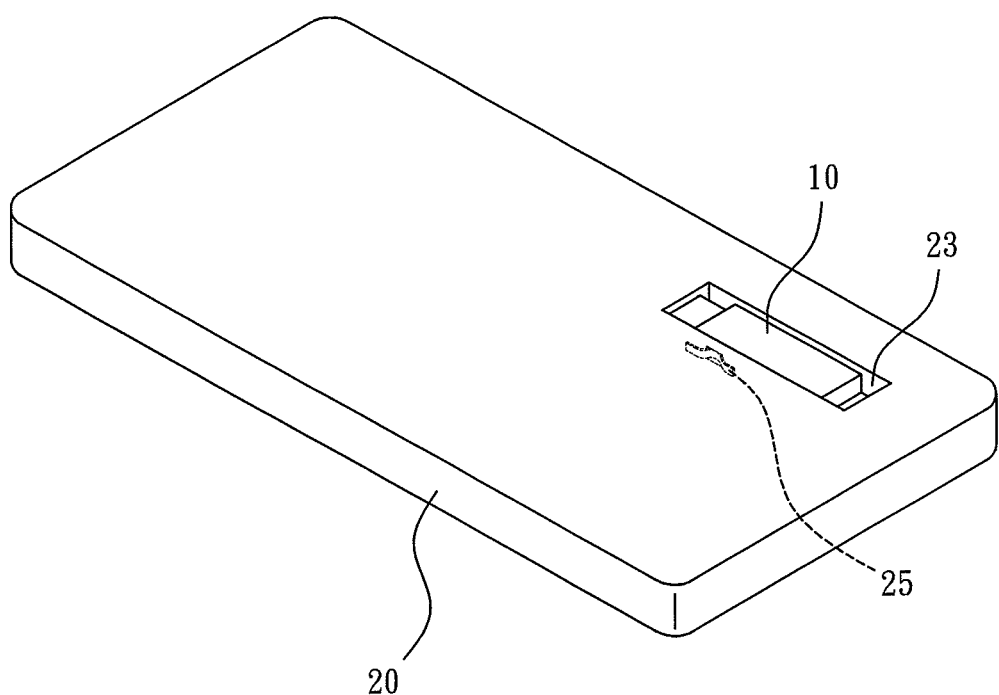

FIG. 8 shows still another embodiment of the electronic device 20. Dissimilar from the above embodiments, the receiving socket 23 formed at a back surface of the electronic device 20 contains therein a resilient retainer 25 for resiliently engaging with the connector 10, so that the connector 10 can be detachably received in the receiving socket 23 and attached to the electronic device 20.

With the foregoing configuration, the disclosed electronic device can hold the High-Definition Multimedia Interface connector in the receiving socket, so that the connector can be easily removed from the receiving socket of the electronic device and then connected to an external terminal, thereby allowing the audio/video signals of the electronic device to be displayed in the terminal. The connector such stored can be easily carried and found for convenient use.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

The invention claimed is:

1. An electronic device designed for holding a High-Definition Multimedia Interface connector that serves to convert audio/video signals of the electronic device into signals of a format of HDMI and output the signals to a terminal, wherein the electronic device has a transmitter module for transmitting audio/video signals in a wireless manner and a receiving socket so that the connector is removably received in the receiving socket, and the connector comprises:

a receiver module that serves to receive the audio/video signal in a wireless manner from the transmitter module;

a converter circuit that serves to convert the audio/video signals into the format of HDMI;

an output module that is configured to be connected to the terminal: and a power module that is connected to a power supply.

2. The electronic device of claim 1, wherein a retaining device is installed in the receiving socket, so that when the connector is received in the receiving socket, the retaining device optionally engages with one lateral side of the connector.

3. The electronic device of claim 2, wherein the retaining device comprises a wedge and a spring, while the connector has one lateral side provided with a positioning hole, so that a propping end of the wedge is pushed by the spring toward and gets received in the positioning hole.

4. The electronic device of claim 3, wherein the wedge has an operation end exposed outside the electronic device, the operation end is configured to be operated and thereby release the wedge from the positioning hole.

5. The electronic device of claim 2, wherein an ejection device is installed in the receiving socket, so that when the connector is received in the receiving socket, the ejection device resiliently pushes the connector.

6. The electronic device of claim 5, wherein the ejection device comprises a pushing member and a resilient member, in which the resilient member serves to make the pushing member keep pushing the connector.

7. The electronic device of claim 1, wherein a jacket is pivotally installed in the receiving socket for receiving the connector in the receiving socket.

8. The electronic device of claim 1, wherein the receiving socket is provided therein with a resilient retainer and the connector has one lateral side provided with a positioning hole for fittingly receiving the resilient retainer.

9. The electronic device of claim 1, wherein the receiving socket is deposited on a lateral surface of the electronic device.

10. The electronic device of claim 1, wherein the receiving socket is deposited on a back surface of the electronic device.

11. The electronic device of claim 1, wherein the electronic device is a smartphone.

12. The electronic device of claim 1, wherein the electronic device is a tablet computer.

13. The electronic device of claim 1, wherein the electronic device is a notebook computer.

14. The electronic device of claim 1, further comprising a control unit that serves to transit the audio/video signals to a receiver module through a transmitter module.

* * * * *